(12) United States Patent
Thomas

(10) Patent No.: US 6,240,713 B1
(45) Date of Patent: Jun. 5, 2001

(54) MOWER HAVING CASTOR WHEEL ASSEMBLIES WITH ROTATIONAL BRAKING MECHANISMS

(75) Inventor: Roger Thomas, Sedgefield (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/350,623

(22) Filed: Jul. 9, 1999

(30) Foreign Application Priority Data

Jul. 11, 1998 (GB) .................................................. 9814998

(51) Int. Cl.⁷ .................................................. A01D 34/10
(52) U.S. Cl. .......................................... 56/16.7; 166/35 R
(58) Field of Search .................................... 56/16.7, 17.2, 56/322, DIG. 18; 16/35 R, 35 D; 188/111 A, 2 R, 1.12; 172/386

(56) References Cited

U.S. PATENT DOCUMENTS

| | | |
|---|---|---|
| 2,523,439 | 9/1950 | May . |
| 2,857,725 | 10/1958 | Canfield . |
| 2,948,544 | 8/1960 | Rowe et al. . |
| 3,382,653 | 5/1968 | De Buigne . |
| 4,246,677 * | 1/1981 | Downing et al. ..................... 16/35 R |
| 4,280,246 * | 7/1981 | Christensen ........................... 16/35 D |
| 4,321,784 | 3/1982 | Wood et al. . |
| 4,349,937 * | 9/1982 | Fontana ................................. 16/35 R |
| 4,349,938 * | 9/1982 | Fontana ................................. 16/35 R |
| 4,368,806 | 1/1983 | Raineri . |
| 4,385,414 * | 5/1983 | Damico ................................. 16/35 R |
| 4,669,580 * | 6/1987 | Neville ................................. 188/1.12 |
| 4,706,328 * | 11/1987 | Broeske ................................. 16/35 R |
| 4,835,952 | 6/1989 | McLane . |
| 4,870,811 | 10/1989 | Steele . |

(List continued on next page.)

FOREIGN PATENT DOCUMENTS

| | | |
|---|---|---|
| 2487497 | 12/1997 | (AU) . |
| 3136203 | 9/1981 | (DE) . |
| 295 08 100 | 5/1995 | (DE) . |
| 297 12 138 | 7/1997 | (DE) . |
| 0111725 | 11/1983 | (EP) . |
| 0367891 | 2/1989 | (EP) . |
| 06254434 | 5/1994 | (EP) . |
| 0714648 | 6/1996 | (EP) . |
| 2252802 | 11/1973 | (FR) . |
| 878834 | 10/1961 | (GB) . |
| 919689 | 2/1963 | (GB) . |
| 1141011 | 1/1969 | (GB) . |
| 1199310 | 8/1970 | (GB) . |
| 1363341 | 8/1974 | (GB) . |
| 1597925 | 9/1981 | (GB) . |
| 2221373 | 2/1990 | (GB) . |
| 2293095 | 3/1996 | (GB) . |
| 2327916 | 2/1999 | (GB) . |
| 9609752 | 4/1996 | (WO) . |
| 9628011 | 9/1996 | (WO) . |

*Primary Examiner*—Robert E. Pezzuto
*Assistant Examiner*—Arpád Fáb Kovács
(74) *Attorney, Agent, or Firm*—Harness, Dickey & Pierce, P.L.C.

(57) ABSTRACT

A lawn mower comprising a deck mounted on at least one castor wheel assembly characterized in that there is provided a locking mechanism capable of holding the at least one castor wheel assembly in the direction it is travelling when the locking mechanism is operated. The locking mechanism comprises a braking surface and a braking element such as a brake band or pad which is movable between a first, or disengaged position where the braking surface is rotatable relative to the braking element to allow the castor wheel assembly to swivel about a substantially vertical axis, and a second, or engaged position where the braking element engages and holds the braking surface. The locking mechanism is manually operable by an operator standing behind the lawn mower and holding the handle thereof.

16 Claims, 3 Drawing Sheets

U.S. PATENT DOCUMENTS

| | | |
|---|---|---|
| 5,020,310 | 6/1991 | Oshima et al. . |
| 5,210,998 | 5/1993 | Hojo et al. . |
| 5,232,071 * | 8/1993 | Kawanabe .......................... 188/1.12 |
| 5,269,125 | 12/1993 | Langley, Sr. et al. . |
| 5,297,379 | 3/1994 | Smith . |
| 5,355,664 | 10/1994 | Zenner . |
| 5,463,855 | 11/1995 | Johnson et al. . |
| 5,497,856 * | 3/1996 | Block et al. ........................ 188/1.12 |
| 5,653,096 | 8/1997 | Edwards . |
| 5,799,366 * | 10/1996 | Zocco et al. ......................... 16/35 R |
| 5,829,096 * | 1/1996 | Perry ..................................... 16/35 R |
| 5,899,469 * | 9/1982 | Pinto et al. ....................... 280/79.11 |

* cited by examiner

MOWER HAVING CASTOR WHEEL ASSEMBLIES WITH ROTATIONAL BRAKING MECHANISMS

TECHNICAL FIELD

The present invention relates to lawn mowers and in particular to lawn mowers mounted on castor wheels.

DISCUSSION

A conventional lawn mower comprises a cutting deck mounted on four wheels. A motor, which can be either an electric motor or an internal combustion engine, is mounted on the cutting deck and which rotatingly drives a cutting blade mounted below the cutting deck about a substantially vertical axis of rotation. A handle is attached to the rear of the cutting deck to enable an operator to maneuver the mower. Often a grass collection box is also attached to the rear of the cutting deck to collect the grass cuttings generated by the mower when in use.

In common mower designs the wheels have a direction of travel which is fixed in a forward and rearward direction. Thus the mower is able to be pushed or pulled in a forward or rearward direction. This is particularly desirable when an operator wishes to operate the mower in straight lines, for instance to generate stripes on a lawn. However, such a design of mower is unable to change direction easily. In order for the direction of travel to be altered, the operator must raise either the front or rear wheels above the ground and rotate the mower to the new direction of travel before then lowering the wheels in order to re-engage the ground. This requires a substantial effort on the part of the operator. Furthermore, the direction of travel of the mower while cutting the grass still remains in a forward/rearward direction which may not be desirable in certain circumstances.

One known method of overcoming these problems is to mount the mower on castor wheels which are capable of swivelling freely through 360°. This enables the lawn mower to be maneuvered in any direction, in a forward/rearward direction, sideways, diagonally, rotationally etc. This makes the lawn mower highly maneuverable. Furthermore, it obviates the need for the operator to raise the wheels off the ground when he wishes to change direction. However, such maneuverability may not be desirable in certain circumstances. For instance, if an operator is using the mower on an inclined surface such as the side of a hill or bank and the operator wishes to traverse along the side of the hill or bank in a straight line with the mower, the operator would have to use considerable effort to maintain the direction of travel of the mower in a straight line and to prevent the mower from sliding sideways down the hill or bank.

It is therefore desirable to have a lawn mower which is able to be changed between two modes of operation, a first mode where the mower is able to move in any direction both linearly and rotationally (i.e. the wheels can freely swivel to any direction of travel), and a second mode where the mower is only able to move in one fixed direction of travel.

U.S. Pat. No. 5,653,096 discloses such a mower. The cutting deck of the mower is mounted on three castor wheels. In its first mode of operation, the castor wheels are able to swivel freely, thereby enabling the mower to be maneuvered in any direction. In its second mode of operation, the direction of travel of the two rear castor wheels of the mower can be locked in a forward/reverse direction or sideways direction. When the direction of travel of the two rear wheels is fixed, the mower is only able to travel in either a forward/reverse direction or a sideways direction.

The locking mechanism disclosed in U.S. Pat. No. 5,653,096 for each rear castor wheel comprises a locking pin mounted on the cutting deck close to the castor wheel. Corresponding holes, which are capable of receiving the locking pin, are formed in the castor wheel. In the first mode of operation the pin is held away from the holes. The castor wheel is able to freely swivel through 360?. However, when one of the holes in the castor wheel is aligned with the locking pin and the locking pin is moved such that it engages with the hole, the castor wheel is prevented from swivelling, its direction of travel being fixed. The direction of travel of the castor wheel is determined by the position of the hole on the castor wheel.

However, the locking mechanism disclosed in U.S. Pat. No. 5,653,096 suffers from a number of problems. Firstly, and most importantly, the direction of travel of the mower when in the second mode of operation is fixed to two predetermined directions, namely sideways and forward/reverse. In certain situations this is undesirable. The user may wish to push the lawn mower diagonally or at an angle and therefore would like to fix the direction of travel of the wheels in these particular directions. Furthermore, the operator may wish to fix the wheels in an orientation which enables the mower to move in an arc, so that it cuts the grass in a uniform manner around an object. This is not possible with the wheel alignment mechanism disclosed in U.S. Pat. No. 5,653,096. Secondly, the operator has to bend down in order to grasp the pin in order to either lock or unlock each of the castor wheels individually, which may cause discomfort for an operator who suffers from back problems. Furthermore, the operator is required to place his hands close to the cutting blade while locking or unlocking the castor wheel, thus putting the operator at unnecessary risk. Thirdly, as the direction of travel of the castor wheel must be fixed with some reasonable accuracy, the diameter of the hole must be similar to that of the pin. However, the castor wheels and hence the holes are located close to the zone swept out by the cutting blade when in use and, as such, would encounter grass cuttings and other debris generated by the cutting action of the mower. When the pins are held away from the holes to allow the wheels to freely swivel, then the holes are filled up with grass cuttings and/or debris, thus preventing the pins from being inserted into the holes. In such circumstances an operator may be likely to try and force the pin into the hole, which could be dangerous, particularly in view of the close proximity of the cutting blade to the castor wheel.

SUMMARY OF THE INVENTION

According to the present invention there is provided a lawn mower comprising a deck mounted on at least one castor wheel assembly characterized in that there is provided a locking mechanism capable of holding the at least one castor wheel assembly in the direction it was travelling when the braking mechanism is operated.

By constructing the lawn mower in such a manner, the lawn mower has the benefits that firstly it is able to operate in two different modes, namely a first mode where it is highly maneuverable and a second mode where the direction of travel of the castor wheels is fixed, secondly, the mower can easily be changed between the two modes of operation and thirdly, when the mower is used in the second mode of operation, the direction of travel of the castor wheels can be locked in any desired angular position.

The locking mechanism holds the castor wheel assembly and prevents it from swivelling about a substantially vertical axis. It will be clear to a person skilled in the art that it is within the scope of the invention that any known braking mechanism can be utilized to hold the castor wheel assembly such as, but not limited to, drum brakes, disk brakes, caliper brakes whether operated hydraulically, pneumatically, electrically or by mechanical means.

The cutting deck can be mounted on four castor wheel assemblies, at least two of which are provided with a locking mechanism.

One simple construction of such a locking mechanism comprises two parts, a first part mounted on the castor wheel assembly, a second part mounted on the deck, a braking surface formed on one part and a braking element mounted on the other part, the braking element being movable between a first position where the braking surface is rotatable relative to the braking element to allow the castor wheel assembly to swivel about a substantially vertical axis and a second position where the braking element engages and holds the braking surface.

The braking element can comprise a band that extends around at least part of the braking surface. Where a band is used as the braking element ideally the castor wheel assembly comprises a sleeve which is rotatably mounted on a rod attached to the deck, the braking surface being formed around the sleeve, the band being attached at one end to the deck and which wraps around the sleeve in a corresponding manner to the braking surface This provides a simple construction for the castor wheel assembly which is capable of interacting with the braking element in a reliable manner.

Alternatively, the braking element is a pad. Where a pad is used as the braking element, ideally the braking surface is formed on at least one side of a disk. Such a disk could be formed around a sleeve of the castor wheel assembly which is rotatably mounted on a rod attached to the deck to provide a compact and simple design.

The locking mechanism may be manually operable by an operator standing behind the lawn mower and holding the handle thereof.

The braking element can be moved between its first and second position by a mechanical link between the handle and the locking mechanism. Such a link could comprise a bowden cable.

Where a bowden cable is used, preferably, the deck is mounted on at least two castor wheel assemblies, both castor wheel assemblies having a locking mechanism wherein the cable of the bowden cable is attached to one braking mechanism, the sleeve of the bowden cable is attached to the other locking mechanism, the two locking mechanisms being configured so that operation of the bowden cable operates the two locking mechanisms in unison. This enables the locking mechanisms for two castor wheel assemblies to be locked simultaneously.

As an alternative to a mechanical link, a hydraulic mechanism can be used.

BRIEF DESCRIPTION OF THE DRAWINGS

A specific embodiment of the invention will now be described with reference to the accompanying drawing of which.

DETAILED DESCRIPTION OF THE PREFERRED EMBODIMENTS

Figure 1:
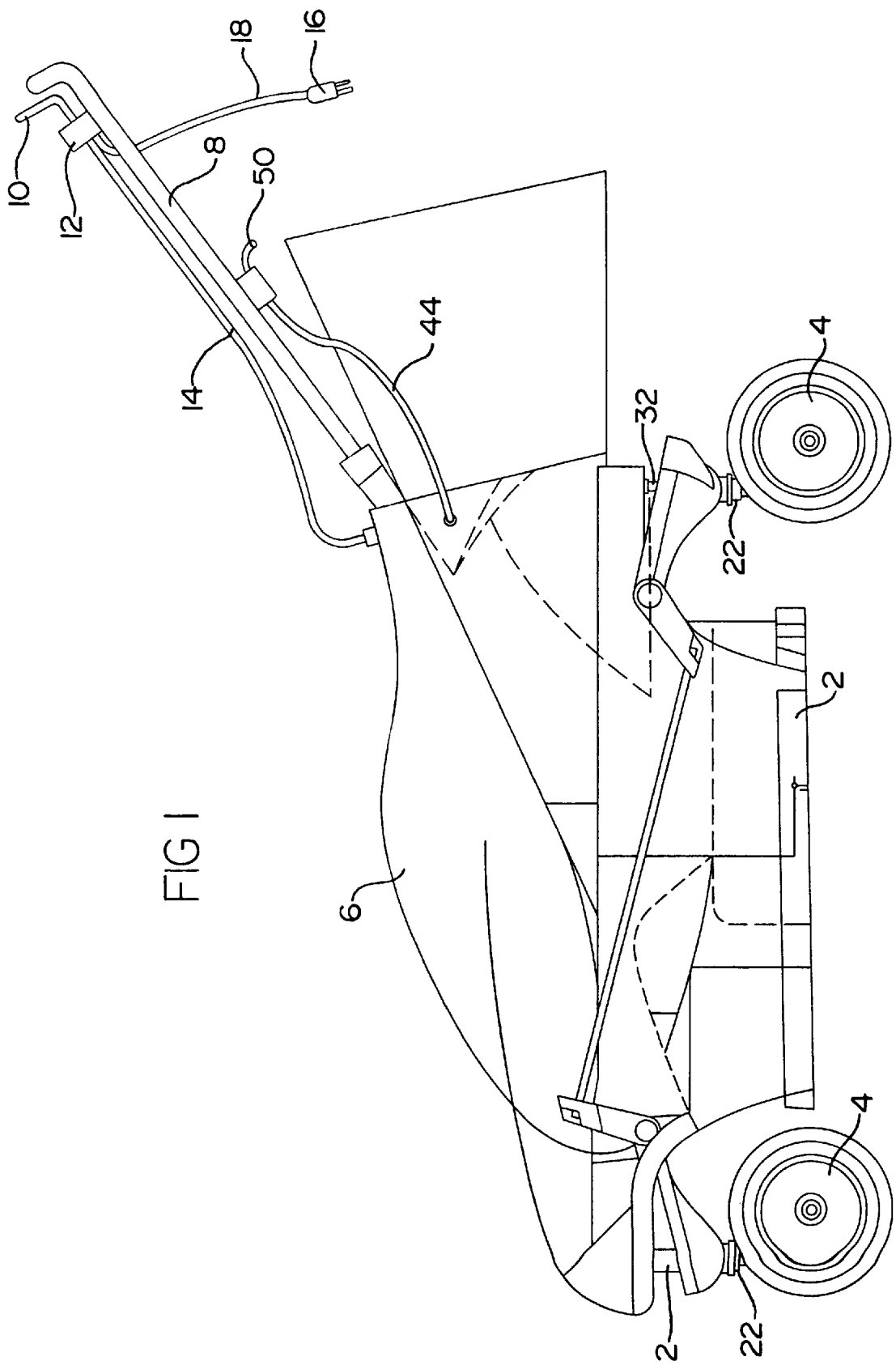
FIG. 1 shows a side view of a lawn mower according to the present invention.

Referring to FIG. 1, the lawn mower comprises a cutting deck (2) mounted on four castor wheels (4) located near to the four corners of the deck (2), an electric motor (not shown) mounted on the deck (2) and a hood (6) which encloses the motor. The motor rotatingly drives a cutting blade (not shown) mounted below the deck (2) on the output drive spindle of the motor about a substantially vertical axis in known fashion. A handle is attached to the rear of the deck (2). Located on the handle (8) is a lever (10) which projects from a lever box (12) attached to the handle (8) and which encloses an electric switch (not shown). An electric cable (14) runs between the lever box (12) and the motor. A second cable (18) runs from the lever box (12) to a plug (16) for attachment to a main electricity power supply. Depression of the lever (10) activates the motor when the plug (16) is attached to a power supply.

Figure 2:
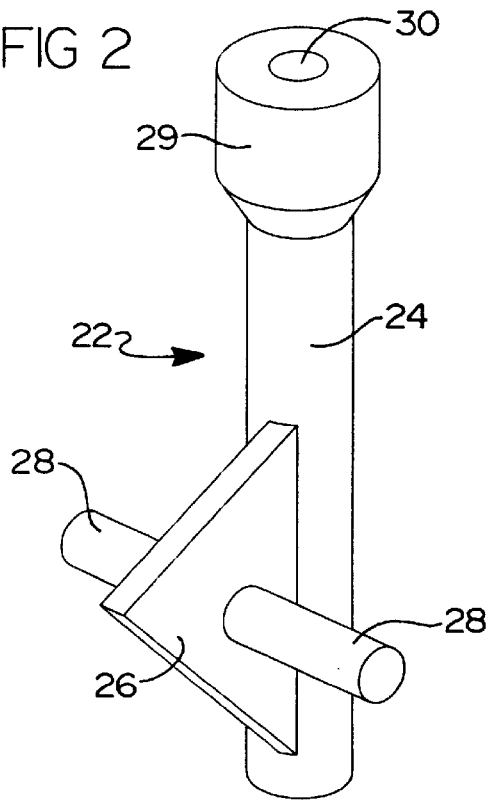
FIG. 2 shows a perspective view of the central mounts of the castor wheel according to a first embodiment of the present invention.

Each castor wheel (4) assembly comprises two wheels (20) of equal dimensions which are mounted on a central mount (22) (as shown in FIG. 2) adjacent to each other and which have the same axis of rotation. Referring to FIG. 2, the central mount (22) comprises a vertical sleeve (24), a vertical triangular flange (26) attached to the side of the base of the sleeve (24) and two rods (28) of circular cross section which project perpendicularly from the sides of the triangular flange (26) in opposite directions. The sleeve (24) forms a bore (30) of circular cross section which is sealed at the base end. The two horizontal rods (28) form axles upon which the two wheels (20) are mounted. Each of the wheels (20) are retained upon the axles (28) by means of a clip (not shown) and are able to freely rotate about the axles (28). A collar (29) is formed around the top end of the sleeve (24). The central mount (22) is formed from a low friction plastic in a one piece construction.

With further reference to FIGS. 1 and 2, in the first embodiment of the present invention, each castor wheel (4) is mounted on a metal rod (32) (FIG. 1) which is rigidly attached to and projects vertically downwards from the underside of the cutting deck (2). Specifically to FIG. 2, the metal rod (32) has a circular cross section having a diameter which is slightly less than that of the bore (30) of the central mounts (22), the central mount (22) being able to freely rotate about the metal rod (32). A clip (not shown) holds the castor wheel (4) onto the metal rod (32) and prevents it from sliding off the rod (32), while allowing the central mount (22) to freely rotate about the metal rod (32).

Figure 3A:
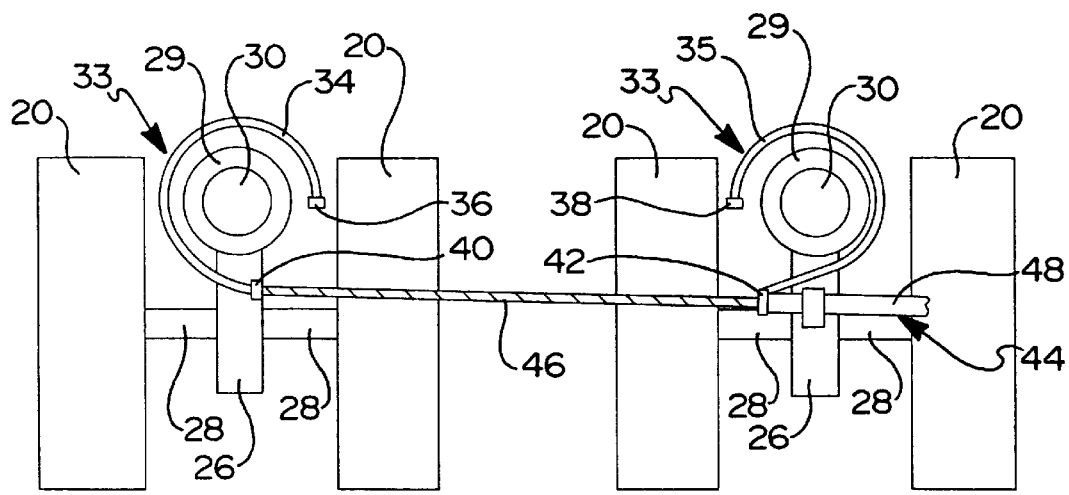
FIGS. 3A and 3B show the band brake mechanism from above in the "OFF" and "ON" position respectively.
Figure 3B:
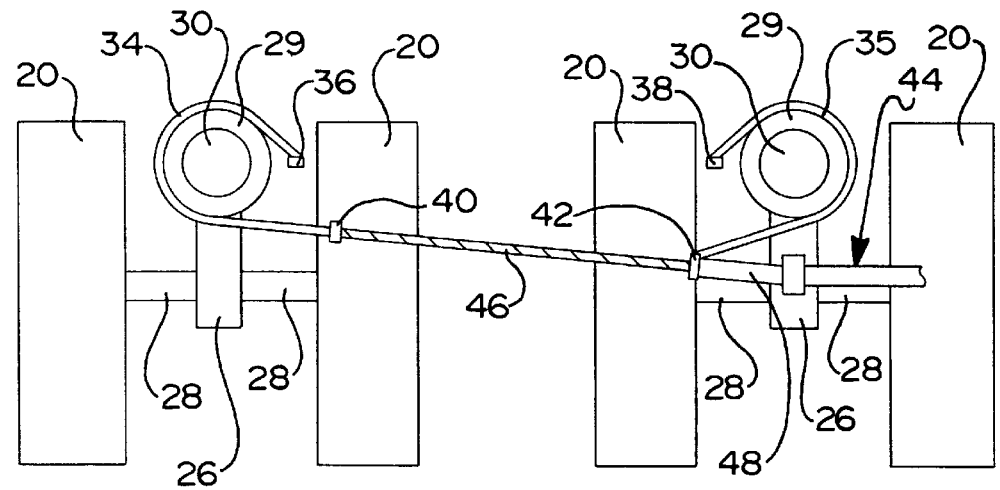

Referring to FIGS. 3A and 3B, band brake mechanisms (33) are attached to the cutting deck (2) in close proximity to each of the rear castor wheels (4). The band (34) of each brake encircles the outer circumference of a respective one of each of the collar (29). One end (36, 38) of each band (34) is rigidly attached to the cutting deck (2). The other end of each band (34) (40, 42) is attached to part of a bowden cable (44).

The brakes 33 operate as a pair. The free end (40) of a band (34) of one of the brakes (33) is attached to the cable (46) which runs within the bowden cable (44). The free end (42) of the band (35) of the other brake (33) is attached to the sleeve (48) of the bowden cable (44). The sleeve (48) of the bowden cable (44) is attached to the underside of the deck (2) by clips (not shown) in such a manner that it is able to axially slide in relation to the underside of the deck (2). The other end of the bowden cable (44) (as best shown in FIG. 1) is attached to a lever (50) mounted on the handle (8) of the lawn mower. Pivotal movement of the lever (50) draws the cable (46) into the sleeve (48).

FIG. 3A shows the bands (34, 35) of the band brakes when no force is being applied to the bands (34, 35) by the bowden cable (44).

FIG. 3B shows the bands (34, 35) of the band brakes (33) wrapped tightly around the collars (29) of the central mounts (22), frictionally holding the central mounts thus preventing them from rotating.

The free end (40, 42) of each the two bands (34, 35) in each pair face towards each other so that, when the cable (46) is drawn into the sleeve (48) of the bowden cable (44) by the pivotal movement of the lever (50), the two free ends (40, 42) are pulled towards each other causing them to tighten around the collars (29) of the castor wheels assemblies (4) (as shown in FIG. 3B). When the band (34, 35) are tightly wrapped around the collars (29), the collars (29), and thus the castor wheels are prevented from rotating about the metal rods (32), hence locking the direction of travel of the castor wheels (20). The bands (34, 35) are held in a locked position by the operator holding the lever (50) in a pivotal position. The brakes (33) are released by the operator releasing the lever (50) allowing the cable (46) to slide out of the sleeve (48) due to the biasing force of the two bands (34, 36) of the brakes. The fixed direction of travel of the castor wheels (20) are locked in the angular orientation that the wheel assemblies (4) were travelling when the brakes (33) were applied.

In use the band brakes (33) are biased towards the first position by the bands (34, 35) (as shown in FIG. 3A). The rear wheels (20) are, therefore, able to freely rotate about the rods (32). An operator can maneuver the lawn mower in any direction.

However, when the operator wishes to fix the direction of travel of the mower, he pulls the lever (50) which, in turn, pulls the cable (46) into the sleeve (48) of the bowden cable (44). The relative movement of the cable (46) and sleeve (48) of the bowden cable (44) pulls the two free ends (40, 42) of the bands (34, 35) towards each other moving the two bands (34, 35) from their first outer positions (as shown in FIG. 3A) towards their second inner positions (as shown in FIG. 3B), tightly gripping the collar (29) of each of wheel assemblies the castor (4).

The collars (29) and thus the castor wheel assemblies (4) are prevented from swivelling. The operator ensures that the fixed direction of travel is that desired by moving the orientation of the castor wheels (4) while they are able to freely swivel, to the desired angle and then locks the wheel assemblies (4).

The operator can achieve this by moving the mower in the desired direction of travel with the wheel assemblies able to freely swivel and then locking the direction of travel of the wheel assemblies. Once the wheels assemblies (4) are locked, the operator continues to hold the lever (50) maintaining the fixed direction of travel of the wheel assemblies (4).

When the operator wishes the wheel assemblies to rotate freely, he releases the lever (50), which allows the bands (34, 35) to release the collars (29) under the biasing force of the bands (34, 35) of the brakes (33).

Figure 4:
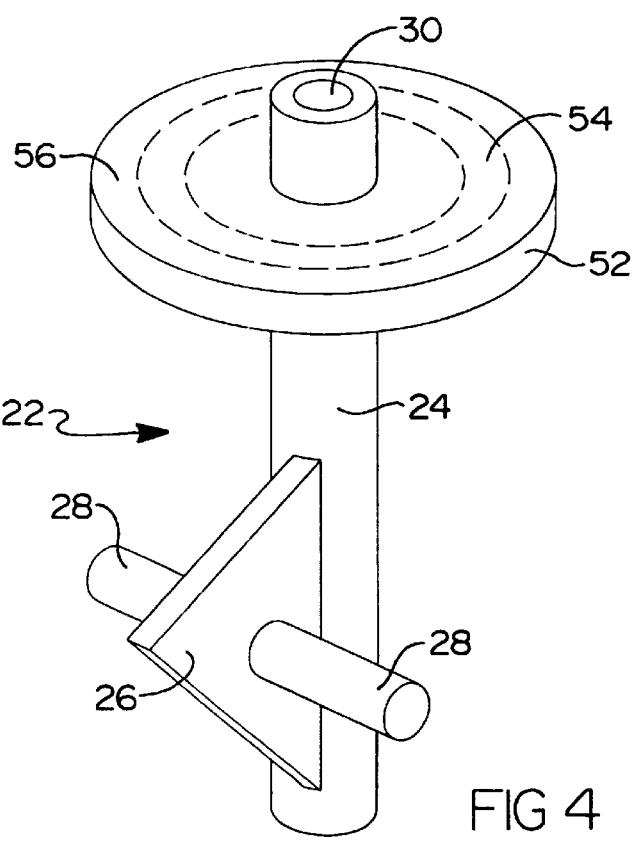
FIG. 4 shows a perspective view of the central mount of the castor wheel according to a second embodiment of the present invention.

A second embodiment of the invention will now be described with reference to FIG. 4.

The construction of each castor wheel assembly (4) is similar to that described in the first embodiment and the method by which it is mounted onto the cutting deck (2) is the same as that for the first embodiment.

The central mount (22) of the castor wheel assembly (4) is constructed in the same manner as that previously described except for a circular disk (52) which is formed around the sleeve (24) of the central mount (22). The disk (52) is integrally formed with the central mount (22). Around the top surface (56) and the bottom surface (not shown) are formed braking surfaces (54) which are located on either side of the disk (52) in a corresponding manner. Each braking surface (54) has a corresponding brake pad (not shown) facing towards it. Each brake pad is movably mounted on the deck (20) and is able to move between two positions, a first position where the pad is located away from the braking surface (54) and a second where it is frictionally engaged with and holds the braking surface (54). The two pads move in unison between the two positions, the movement being controlled by a hydraulic mechanism (not shown) in a similar manner to that of a disk brake used on the wheels of motor vehicles to slow the rate of rotation of the wheels down. When the pads are located in the first position, the central mount (22) and hence the castor wheel (4) is able to freely swivel, when the pads are in the second position, the central mount (22) is held in the angular position it was located in when the pads frictionally engage with the disk (52).

What is claimed is:
1. A lawn mower comprising:
a deck mounted on at least one castor wheel assembly;
a locking mechanism capable of holding at least one castor wheel assembly in a plurality of different positions relative to a direction of travel of the mower; and
an actuating system for enabling an operator to engage and disengage said locking mechanism;
wherein the locking mechanism further includes:
a first part mounted on the castor wheel assembly;
a second part mounted on the deck;
a braking surface formed on one of said first and second parts;
a braking element mounted on the other one of said first and second parts, the braking element being movable between a first position where the braking surface is rotatable relative to the braking element to allow the castor wheel assembly to swivel about a substantially vertical axis and a second position where the braking element engages the braking surface to hold the castor wheel assembly stationary relative to said direction of travel; and
wherein the braking element comprises a band that extends around at least one part of the braking surface.
2. A lawn mower as claimed in claim 1, wherein the castor wheel assembly comprises a sleeve which is rotatably mounted on a rod attached to the deck, the braking surface being formed around the sleeve.
3. A lawn mower as claimed in claim 1, wherein the braking element comprises a pad.
4. A lawn mower as claimed in claim 3, wherein the braking surface is formed on at least one side of a disk.
5. A lawn mower as claimed in claim 4, wherein the castor wheel assembly comprises a sleeve rotatably mounted on a rod attached to the deck, the disk being formed around the sleeve.
6. A lawn mower as claimed in claim 4, wherein the locking mechanism is manually operable by an operator standing behind the lawn mower and while holding a handle thereof.

7. A lawn mower as claimed in claim 1, wherein the braking element is moved between the first and second position by a mechanical link between the locking mechanism and a handle of said mower.

8. A lawn mower as claimed in claim 7, wherein the mechanical link comprises a bowden cable.

9. A lawn mower as claimed in claim 8, wherein the deck is mounted on at least a pair of the castor wheel assemblies, both castor wheel assemblies of the pair each having a locking mechanism wherein a cable of the bowden cable is attached to one of the locking mechanisms, a sleeve of the bowden cable is attached to the other one of the locking mechanisms, the two locking mechanisms being configured so that operation of the bowden cable operates the two locking mechanisms in unison.

10. A lawn mower comprising:
    a deck mounted on four castor wheel assemblies;
    a pair of locking mechanisms capable of holding at least two of said castor wheel assembly in a plurality of different positions relative to a direction of travel of the mower; and
    an actuating system for enabling an operator to engage and disengage said locking mechanism;
    wherein the locking mechanism comprises:
        a first part mounted on at least one of the castor wheel assemblies;
        a second part mounted on the deck;
        a braking surface formed on one of said first and second parts;
        a braking element mounted on the other of said first and second parts, the braking element being movable between a first position where the braking surface is rotatable relative to the braking element to allow the one castor wheel assembly to swivel about a substantially vertical axis and a second position where the braking element engages and holds the braking surface; and
    wherein the braking element comprises a band that extends around at least one part of the braking surface.

11. A lawn mower as claimed in claim 10, wherein the castor wheel assembly comprises a sleeve which is rotatably mounted on a rod attached to the deck, the braking surface being formed around the sleeve.

12. A lawn mower as claimed in claim 10, wherein the braking element comprises a pad.

13. A lawn mower as claimed in claim 12, wherein the braking surface is formed on at least one side of a disk.

14. A lawn mower as claimed in claim 10, wherein the braking element is moved between the first and second positions by a mechanical link between the locking mechanism and a handle of the mower.

15. A lawn mower as claimed in claim 14, wherein the mechanical link comprises a bowden cable.

16. A lawn mower as claimed in claim 15, wherein the deck is mounted on at least a pair of the castor wheel assemblies, both said castor wheel assemblies of the said pair each having a locking mechanism, wherein a cable of the bowden cable is attached to one of the locking mechanisms, a sleeve of the bowden cable is attached to the other one of the locking mechanism, the two locking mechanisms being configured so that operation of the bowden cable operates the two locking mechanisms in unison.

* * * * *